(12) United States Patent
Chauvin et al.

(10) Patent No.: US 8,944,805 B2
(45) Date of Patent: Feb. 3, 2015

(54) METHOD AND APPARATUS FOR PACKAGING A LIQUID FOOD PRODUCT

(71) Applicant: NESTEC S.A., Vevey (CH)

(72) Inventors: Guillaume Chauvin, Monthureux sur Saone (FR); Fabio Chimetto, Piazzola sul Brenta (IT); Klaus Hartwig, Nancy (FR)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 14/225,868

(22) Filed: Mar. 26, 2014

(65) Prior Publication Data
US 2014/0205707 A1    Jul. 24, 2014

Related U.S. Application Data

(62) Division of application No. 13/002,197, filed as application No. PCT/EP2009/058306 on Jul. 2, 2009, now Pat. No. 8,720,166.

(30) Foreign Application Priority Data

Jul. 7, 2008   (EP) .................................... 08159855

(51) Int. Cl.
*B29C 49/12*   (2006.01)
*B29C 49/46*   (2006.01)
(Continued)

(52) U.S. Cl.
CPC ............. *B29C 49/4268* (2013.01); *B29C 49/12* (2013.01); *B29C 49/46* (2013.01); *B65B 3/022* (2013.01); *B29C 49/06* (2013.01); *B29C 49/78* (2013.01); *B29C 2049/4655* (2013.01); *B29C 2049/4664* (2013.01); *B29K 2023/06* (2013.01); *B29K 2023/12* (2013.01); *B29K 2025/00* (2013.01); *B29K 2027/06* (2013.01);
(Continued)

(58) Field of Classification Search
USPC ......................................... 425/524, 529, 535
See application file for complete search history.

(56) References Cited

U.S. PATENT DOCUMENTS

| 7,473,388 B2 | 1/2009 | Desanaux et al. |
| 2008/0029928 A1 * | 2/2008 | Andison et al. ............... 264/238 |

FOREIGN PATENT DOCUMENTS

| EP | 1529620 | 5/2005 |
| FR | 2839277 | 11/2003 |

(Continued)

OTHER PUBLICATIONS

PCT International Search Report for Application No. PCT/EP2009/058306 Mailing Date of Sep. 29, 2009—5 pages.

*Primary Examiner* — Robert B Davis
(74) *Attorney, Agent, or Firm* — K&L Gates LLP (57) ABSTRACT

The invention relates to a method of, and a device for delivering a predetermined (1) volume of beverage into a thermoplastic container formed from a heated preform, the preform being positioned in a mold, characterized in that the method includes a step of injecting at least some beverage into a recess in the preform so as to promote expansion of the preform inside the mold, the mold defining the shape of the container, a longitudinal displacement of a stretch rod (10) carried out during a given period ensuring longitudinal elongation of the heated preform, the stretch rod being immobile at the end of the given period, and a volume of beverage greater than a predefined fraction of the predetermined volume, preferably equal to 50%, being present in the recess at said end of the given period.

8 Claims, 5 Drawing Sheets

(51) Int. Cl.
*B29C 49/42* (2006.01)
*B65B 3/02* (2006.01)
*B29C 49/06* (2006.01)
*B29C 49/78* (2006.01)
*B29K 23/00* (2006.01)
*B29K 25/00* (2006.01)
*B29K 27/06* (2006.01)
*B29K 67/00* (2006.01)
*B29K 69/00* (2006.01)
*B29K 667/00* (2006.01)

(52) U.S. Cl.
CPC ....... *B29K2067/00* (2013.01); *B29K 2067/046* (2013.01); *B29K 2069/00* (2013.01); *B29K 2623/06* (2013.01); *B29K 2667/00* (2013.01)
USPC .......................... 425/524; 425/529; 425/535

(56) References Cited

FOREIGN PATENT DOCUMENTS

| | | |
|---|---|---|
| JP | 2000043129 | 2/2000 |
| WO | 2006096916 | 9/2006 |
| WO | 2007120807 | 10/2007 |

\* cited by examiner

Fig. 1

(prior art)

Fig. 5

METHOD AND APPARATUS FOR PACKAGING A LIQUID FOOD PRODUCT

PRIORITY CLAIM

This application is a divisional application of U.S. patent application Ser. No. 13/002,197, filed on Dec. 30, 2010, which is a National Stage of International Application No. PCT/EP2009/058306, filed Jul. 2, 2009, which claims priority to European Application No. 08159855.9, filed Jul. 7, 2008, the entire contents of which are being incorporated herein by reference.

FIELD OF THE INVENTION

The present invention relates to the field of manufacturing containers made of a polymer material, especially a polyester. More particularly, it relates to the field of manufacturing polyester bottles, preferably polyethylene terephthalate (PET) bottles containing a liquid, preferably water and especially mineral water.

BACKGROUND

For many years, the PET bottles usually found on the market have been manufactured by the blow moulding or stretch-blow moulding of PET preforms using compressed air.

A preform usually takes the form of a cylindrical tube closed at one of its ends and open at its opposite end. The open head of the preform corresponds to the neck of the container. During the conventional process for manufacturing containers from preforms, the preforms are slipped onto the cylindrical mounts of a continuous conveyor chain, which thus transports the preforms through an oven, essentially formed by a straight section bordered on each side by radiative heating means, so as to temperature-condition the plastic for the subsequent stretch-blow moulding step.

The hot preform is then taken off and transported into a mould of a blow moulding machine. The transport movement, performed for example by a transfer arm, is coordinated with that of the blow moulding machine, which is generally produced in the form of a rotary carousel that rotates continuously about its vertical axis and carries, on its periphery, a series of identical moulds. Thus, the preform is placed in the mould immediately after it has been opened and the previously formed container has been removed.

The preform is heated beforehand so as to be in the mould at a temperature above the glass transition temperature (about 100° C.) so as to enable it to be formed by stretch-blow moulding. The temperature of the preform at the end of the heating step is slightly above that required inside the mould of the blow moulding machine, so as to take into account the cooling that takes place over the distance that exists between the heating site and the blow-moulding site. Thanks to the simultaneous presence of several moulds, such a blow moulding machine can produce containers at very high rates, of around several tens of thousands of units per hour, i.e. around 1000 to 2000 bottles per hour per mould.

The stretch-blow moulding takes place by stretching using a metal rod and by injecting air at pressures ranging from 3 to 40 bar ($3 \times 10^5$ Pa to $4 \times 10^6$ Pa). The air is injected through a nozzle, the end of which is introduced through the opening in the head of the preform.

Bottles manufactured by injecting pressurized air have a relatively satisfactory lifetime. However, the intrinsic properties and characteristics of PET, in particular its specificity which is to crystallize on being stretched, mean that even better results may be envisaged by modifying the container manufacturing process. In particular, it is known that high crystallinity means better mechanical strength.

The present invention makes it possible to extend the average lifetime of the containers within the context of normal transport, distribution and consumption. It also makes it possible to speed up the industrial production process, by optimizing the production steps and minimizing the in-line losses.

The invention applies preferentially to the class of polyesters in general, and to PET in particular.

SUMMARY

The Applicant therefore proposes, within the context presented above, a method of delivering a predetermined volume of beverage into a thermoplastic container formed from a heated preform, the preform being for example approximately cylindrical and positioned in a mould, the method including a step of injecting at least some beverage into a recess in the preform so as to promote expansion of the preform inside the mould, the mould defining the shape of the container, a longitudinal displacement of a stretch rod carried out during a given period ensuring longitudinal elongation of the heated preform, the stretch rod being immobile at the end of the given period, and a volume of beverage greater than 50% of the predetermined volume being present in the recess at said end of the given period.

This method makes it possible to improve the quality of the containers obtained. In general, the condition whereby the bottle-filling piston has already covered more than half of its total travel when the stretching is stopped is a sine qua non condition for preventing the bottle from exploding in the mould.

According to one advantageous feature, a volume of beverage greater than 75%, of the predetermined volume is present in the recess at said end of the given period.

The containers obtained using this method have much better characteristics than those obtained with a conventional stretch-blow moulding method using gaseous fluid to inflate them. In particular, it has been found that, for a given weight and a given type of material, they have a longer lifetime. The degree of crystallinity, i.e. the mass of crystalline phase relative to the mass of polymer, of a container obtained by the method according to the invention may in particular be much higher.

According to one embodiment, the displacement and the injection are controlled by a programmable computer-aided manufacturing device.

Alternatively, and optionally in combination, the displacement and the injection are controlled by a cam.

According to one advantageous feature, during said prior heating step, the temperature of the preform is brought to between 50° C. and 130° C., or even to between 75° C. and 100° C.

Preferably, a speed of the stretch rod reached during said displacement is between 0.5 and 3.0 m/s, or even between 1 and 2.5 m/s.

According to a preferred feature, during the injection step, a volume of beverage has a temperature between 1° C. and 120° C., or even a temperature between 10° C. and 90° C.

Preferentially, provision is made for a longitudinal stretch ratio of the preform, measured between the start and end of the injection step, to be between 2 and 5 or between 2.5 and 4.

Moreover, according to one embodiment, a radial stretch ratio of the preform, measured between the start and end of the injection step, is between 2 and 7, or even between 3 and 4.5.

It should be emphasized that the invention applies most particularly well to the case in which the thermoplastic is chosen from the group consisting of polyethylene terephthalates, polypropylenes, polyethylenes, polycarbonates, polystyrenes, polylactic acids, polyvinyl chlorides and combinations thereof.

Preferably, the method further includes a prior gas injection step so as to promote expansion of said preform, such that the volume of the preform is brought up to a predefined fraction, advantageously 70%, of the predetermined volume.

Advantageously, the prior gas injection step is followed by a beverage injection step so as to promote expansion of said preform until the preform has reached said predetermined volume.

This is because air is not as capable as the beverage of cooling the thermoplastic undergoing expansion. These characteristics therefore have the advantage of providing a more stable method and a wider window in implementing the method.

According to one advantageous feature, the mould is brought beforehand to a temperature at least 50° C. below the melting point of the thermoplastic.

Again, the method according to the invention may also include a subsequent step of fitting a closure cap onto the container.

In this case, the step of injecting at least some of the beverage preferably comprises injecting a volume of beverage into which gas has been introduced beforehand so as to create an overpressure in the neck of the container after the closure cap has been fitted.

Finally, according to one aspect, the longitudinal displacement of the rod is performed at a constant speed.

Also, the invention takes place through a nozzle having a bell-shaped head, so as to reduce the risks of deforming a neck of the preform.

The invention also proposes a device for delivering a predetermined volume of beverage into a thermoplastic container formed from a heated preform, the preform being approximately cylindrical and positioned in a mould, the device comprising means for injecting at least some beverage into a recess in the preform so as to promote expansion of the preform inside the mould, the mould defining the shape of the container, means for longitudinally displacing a stretch rod over a given period and for longitudinally elongating the heated preform, the stretch rod being immobile at the end of the given period, and means for ensuring that a volume of beverage greater than a predefined fraction of the predetermined volume, preferably 50%, is present in the recess at said end of the given period.

Advantageously, this device may include means suitable for carrying out the respective intended steps of the method, taken separately or in combination.

BRIEF DESCRIPTION OF THE FIGURES

The invention will now be described in detail with reference to the appended figures, which relate to exemplary embodiments.

DETAILED DESCRIPTION

The embodiment given here by way of example relates to a process for manufacturing PET mineral water bottles from a heated preform. The preform has the shape of a cylindrical tube closed at its lower end. The open head of the preform corresponds to the throat or neck of the bottle, onto which a closure cap is screwed.

Figure 1:
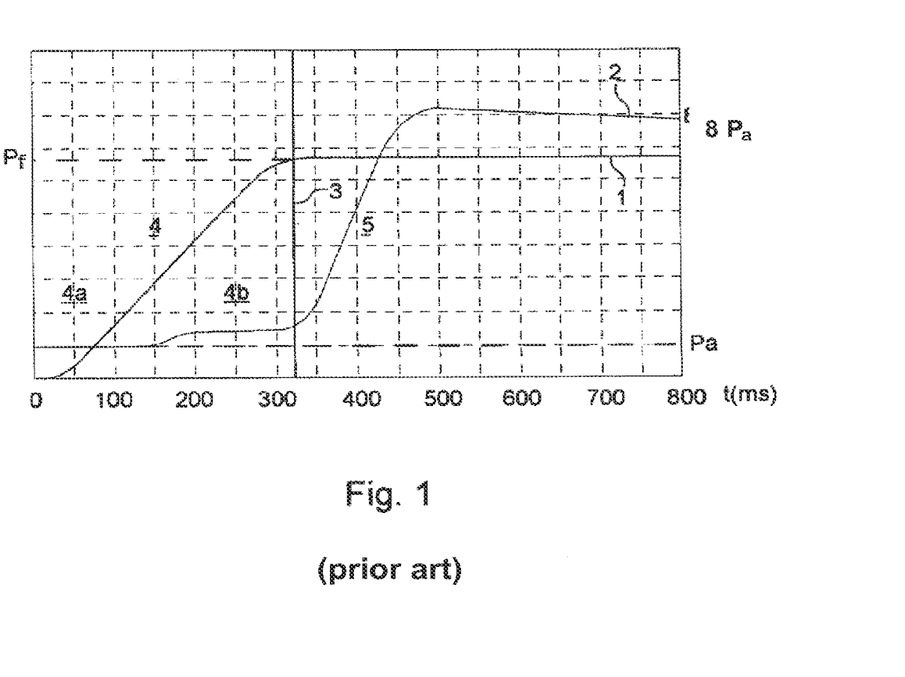
FIG. 1 shows the monitoring of the formation of a mineral water bottle according to an example of the prior art.

FIG. 1 shows the variation over time of the position 1 of the stretch one solution of the prior art.

In this figure, the x-axis represents time, the y-axis on the left represents the linear position of the stretch cam, while the y-axis on the right represents the air pressure in the preform undergoing expansion.

During a first phase 4 of the process, in particular between 50 ms and 275 ms, the stretch rod advances linearly, with an approximately constant speed.

320 ms after the start of the process (reference 3), the stretch rod has reached its final position $P_f$, from which it no longer moves.

During a first part 4a of the first phase of the process, the air pressure 2 in the preform, initially equal to the atmospheric pressure $P_a$ and remaining so up to 150 ms after the start of the process, increases up to a value of about 1.4 times the atmospheric pressure, which value is reached 200 ms after the start of the process.

During a second part 4b of the first phase of the process, lasting a further 100 ms, i.e. up to 300 ms after the start of the process, the pressure remains constant.

During a second phase 5 of the process, the pressure rapidly increases, with an approximately constant rate of rise until 450 ms, when it reaches a value equal to about 8 times the atmospheric pressure.

From this moment on, the pressure in the expanding preform decreases slightly, while still remaining of the order of magnitude of 8 times the atmospheric pressure.

Moreover, and without wishing to be tied down by any scientific theory, it is known that polyester preforms are amorphous and that the stretching induces, at the same time, crystallization and an exothermic reaction. Now, the evolution of heat is deleterious to the development of crystallinity.

Figure 2:
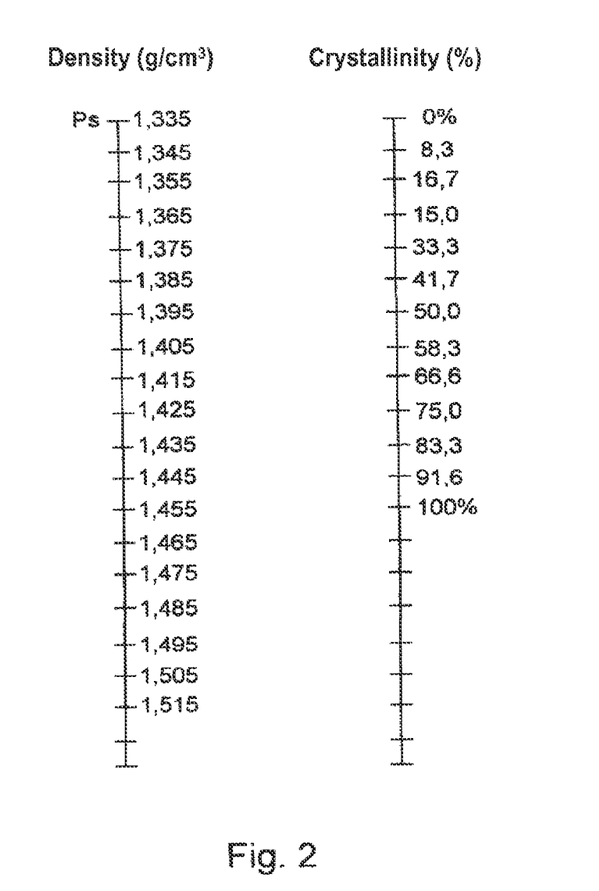
FIG. 2 shows a crystallinity scale used in relation to the method according to the invention.

Referring to FIG. 2, a first stretch is therefore performed with the stretch rod, causing crystallization and evolution of heat, and at that moment the incompressible fluid is introduced, which then absorbs the heat given off and shifts the equilibrium point of the crystallinity obtained in the final container towards high values, preferably between 30 and 35%.

The crystallinity is measured in a Lloyd-Davenport density column using the following method. The column is filled with a salty (calcium nitrate) solution having a density gradient. The column is calibrated with balls having a known density between 1.335 and 1.455. Next, small pieces of the container according to the invention are immersed in the column and after a certain time these stabilize at a certain height in the column corresponding to a certain density. The measurements are made at 23° C. The table in the figure gives the crystallinity.

Figure 3:
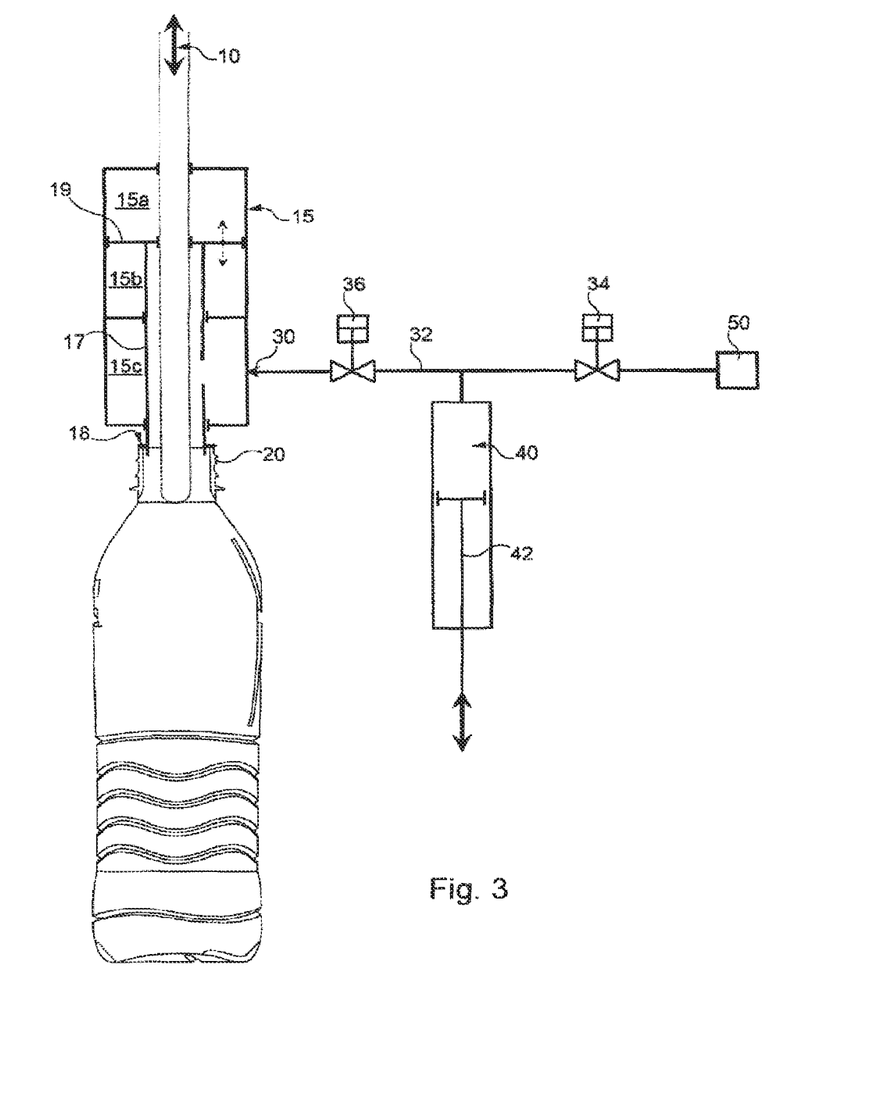
FIG. 3 shows a general diagram of the installation used.

Referring to FIG. 3, a stretch rod 10 is inserted into a compressed-air actuator 15. The stretch rod 10 is controlled by a stretch motor which gives it a longitudinal movement (represented by an arrow).

The compressed-air actuator 15 comprises a cylinder 17 controlling an injection head 18, through which the stretch rod 10 passes. The injection head 18 is connected to the neck 20 of a PET preform placed in a mould (not shown), which preform, after being expanded, takes on the shape of a mineral water bottle, this shape being determined by the wall of the mould.

The actuator comprises three chambers, the upper two chambers 15a and 15b being filled with compressed air. Between these upper two chambers, a piston wall 19 slides in a direction parallel to the stretch rod (the displacement being represented by an arrow). The stretch rod 10 passes through the centre of this wall 19.

The compressed-air actuator also includes a lateral inlet 30 for the beverage, here mineral water, connected to the third chamber 15c of the actuator, this being the bottom chamber. The beverage is fed in via a line 32.

An external mineral water inlet feeds the liquid via the remote end of this line 32 into a first valve 34, which is connected to the opening of a single-chamber filling cylinder 40 comprising a piston 42 controlled by a filling motor (movement of which is represented by an arrow). This motor imparts a longitudinal movement on the piston in the single chamber of the filling cylinder 40.

On the line 32 there is a second valve 36, which is in series behind the first valve 34 and the opening of the filling cylinder 40. The line 32 then runs into the bottom chamber 15c of the compressed-air actuator 15.

The bottom chamber 15c of the compressed-air actuator is penetrated by the cylinder 17 for controlling the filling head 18, the internal volume of which emerges through the lower outlet of the compressed-air actuator 15 into the filling head 18. The control cylinder has a lateral opening allowing the beverage to circulate between the bottom chamber of the actuator and the inside of the control cylinder.

The stretch rod 10 itself passes through the control cylinder 17 as far as the filling head 18 and the neck 20 of the bottle preform.

Figure 4:
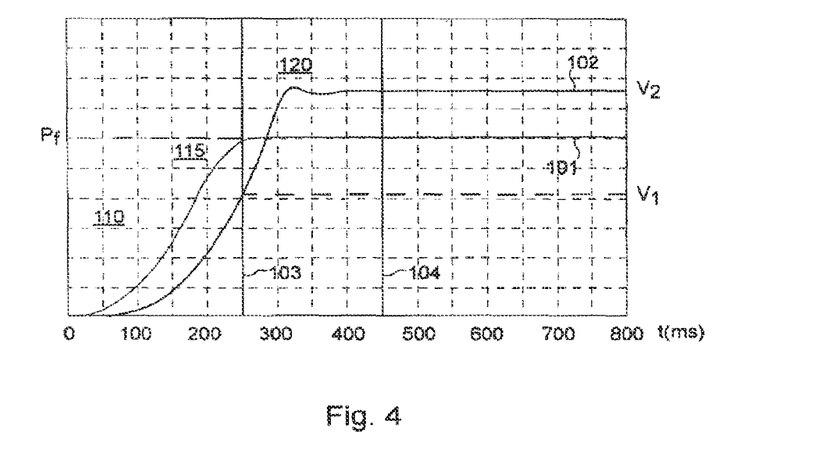
FIG. 4 shows the monitoring of the formation of a mineral water bottle according to a preferred embodiment of the invention.

FIG. 4 shows the variation over time of the position 101 of the stretch rod and the position 102 of the filling actuator controlling the inflow of the mineral water into the expanded preform.

The horizontal axis represents the time, the left-hand vertical axis represents the position of the stretch rod and the right-hand vertical axis represents the volume of water introduced into the expanded preform, this being proportional to the position of the filling actuator.

During a first part of the process, from 0 to 250 ms, the stretch rod advances at an essentially constant rate, according to a preferred embodiment.

However, according to another embodiment, during a first phase 110 of the process, in particular from 0 to 150 ms, the stretch rod advances at an increasing speed due to a positive acceleration. During a second phase 115 of the process, from 150 ms to 250 ms, the stretch rod advances with a negative acceleration, the speed decreasing until it becomes zero at 250 ms. However, it will be understood that the changes in speed must be sufficiently gentle to ensure regular and reliable stretching of the thermoplastic.

250 ms after the start of the process (reference 103), the stretch rod has reached its final position Pf, from which it no longer moves.

At the same instant, the filling actuator has introduced a volume $V_1$ of mineral water into the expanded preform. The volume introduced from the start of the process (therefore between 0 ms and 250 ms) has progressively increased, with a progressive increase in the flow rate (filling actuator displacement acceleration).

During the moments that follow, which constitute a third phase 120 of the process, up to 320 ms, the total volume of water introduced is constant, the flow rate being invariant. Next, the volume suddenly decreases by a small fraction (around 4%) over a period of 40 ms.

From this instant on, the total volume introduced stabilizes around the value $V_2$, which is finally reached after a few oscillations, the flow rate of liquid being introduced being zero.

A few instants later, starting from 450 ms after the start of the process (reference 104), the filling actuator has reached a final position, from which it no longer moves. At this moment, it has introduced a volume $V_2$ of mineral water into the expanded preform. The volume $V_2$ is greater than $V_1$, but less than twice the volume $V_1$.

During the method of using the device described, the temperature of the preform is brought beforehand to a value between 50° C. and 130° C., or even between 75° C. and 100° C. In the preferred embodiment, this value is 85° C.

In general, a bottle is defined to be of high quality on the basis of the fact that it has not exploded in the mould.

The tests carried out show that it is not possible to form a bottle completely if physically it has not reached 50% of its final volume at the end of the active stretching.

During the method of using the device described, the temperature of the preform is brought beforehand to a value between 50° C. and 130° C., or even between 75° C. and 100° C. In the preferred embodiment, this value is 95° C., the plastic used being PET.

The rod has a speed of between 0.5 and 3.0 m/s"1, or even between 1.0 and 5 m/s'. In the preferred embodiment, this value is 1.6 m/s–'.

The temperature of the beverage is brought beforehand to a value between 1° C. and 120° C., preferably between 10° C. and 90° C. In the preferred embodiment, this value is 30° C.

The longitudinal stretch ratio of the thermoplastic is between 2 and 5 or even between 2.5 and 4. In the preferred embodiment, this value is 3.5.

The radial stretch ratio of the thermoplastic is between 2 and 7, or even between 3 and 4.5. In the preferred embodiment, this value is 4.

The thermoplastic is chosen from the group consisting of polyethylene terephthalates, polypropylenes, polyethylenes, polycarbonates, polystyrenes, polylactic acids, polyvinyl chlorides and combinations thereof. In the preferred embodiment, it is PET.

The temperature of the mould is at least 50° C. below the melting point of the thermoplastic, which in the case of PET is 230° C. Preferably, this temperature is maintained below 100° C. In the preferred embodiment, the temperature of the mould is equal to the ambient temperature.

Figure 5:
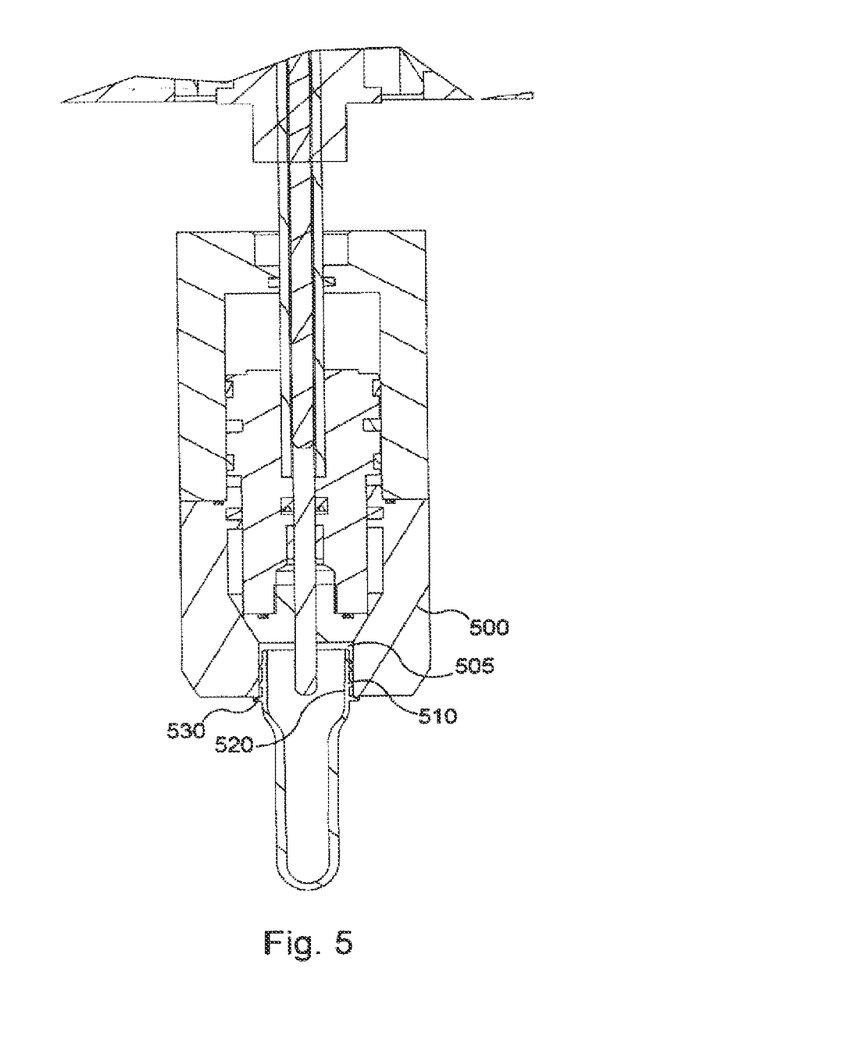
FIG. 5 shows another aspect of the invention.

Referring to FIG. 5, a bell-shaped nozzle end-piece 500 according to a preferred embodiment is shown. The internal and external pressures on either side of the circumference of the neck of the preform (i.e. on the external surfaces 510 of the neck and on the internal surfaces 520 of the neck) are identical, owing to the presence of a passage 505 connecting the volumes on either side of the circumference, inside the nozzle. During filling, sealing is provided by the flange 530 on the preform. Thanks to this device, there is no risk of the neck of the preform deforming while a pressurized fluid is being injected by the nozzle.

According to another embodiment, a nozzle end-piece holds the external surfaces 510 of the neck of the preform in such a way that when a pressurized fluid is injected via the top of the nozzle into the recess of the preform, the pressure exerted on the internal walls 520 of the neck of the preform by the fluid is compensated for by the holding by the walls of the bell-shaped nozzle end-piece. The neck of the preform therefore does not deform, despite the high pressure.

Of course, the invention is not limited to the embodiments described and illustrated by the appended drawings; rather it extends to all variants that can be envisaged by a person skilled in the art within the scope of the claims.

The invention is claimed as follows:

1. A device for delivering a predetermined volume of beverage into a thermoplastic container formed from a heated preform, the preform being positioned in a mold, the device comprising:
    an injector for injecting at least some beverage into a recess in the preform so as to promote expansion of the preform inside the mold, the mold defining the shape of the container,
    a displacement member for longitudinally displacing a stretch rod over a given period and for longitudinally elongating the heated preform, the stretch rod being immobile at the end of the given period,
    a member for ensuring that a volume of beverage greater than a predefined fraction of the predetermined volume is present in the recess at the end of the given period, and
    a programmable computer that is configured to control the displacement member and the injector such that the stretch rod is longitudinally displaced over a given period and immobile at the end of the given period, and a volume of beverage greater than a predefined fraction of the predetermined volume is present in the recess at the end of the given period.

2. The device of claim 1 further comprising a nozzle end piece that is so constructed and arranged to surround a neck of the preform such that a passage connects (i) a volume between an outer circumference of the neck and the nozzle end piece and (ii) a volume on an inner circumference of the neck.

3. The device of claim 2, wherein a flange on the outer circumference of the neck of the preform provides a seal between the outer circumference of the neck and the nozzle end piece.

4. The device of claim 1 further comprising a compressed air actuator comprising three chambers, each of which is filled with compressed air.

5. The device of claim 4 further comprising a cylinder and an injection head through which the stretch rod passes.

6. The device of claim 5, wherein the injection head is configured to be connected to a neck of the preform.

7. The device of claim 4, wherein the compressed air actuator further comprises a lateral inlet for a beverage connected to a chamber of the compressed air actuator.

8. The device of claim 7, wherein the lateral inlet is connected, via a line and at least one valve, to the member for ensuring that a volume of beverage greater than a predefined fraction of the predetermined volume is present in the recess at the end of the given period.

* * * * *